July 8, 1924.
W. J. SPIRO
WINDSHIELD CLEANER
Filed Jan. 2, 1923   2 Sheets-Sheet 2
1,500,654
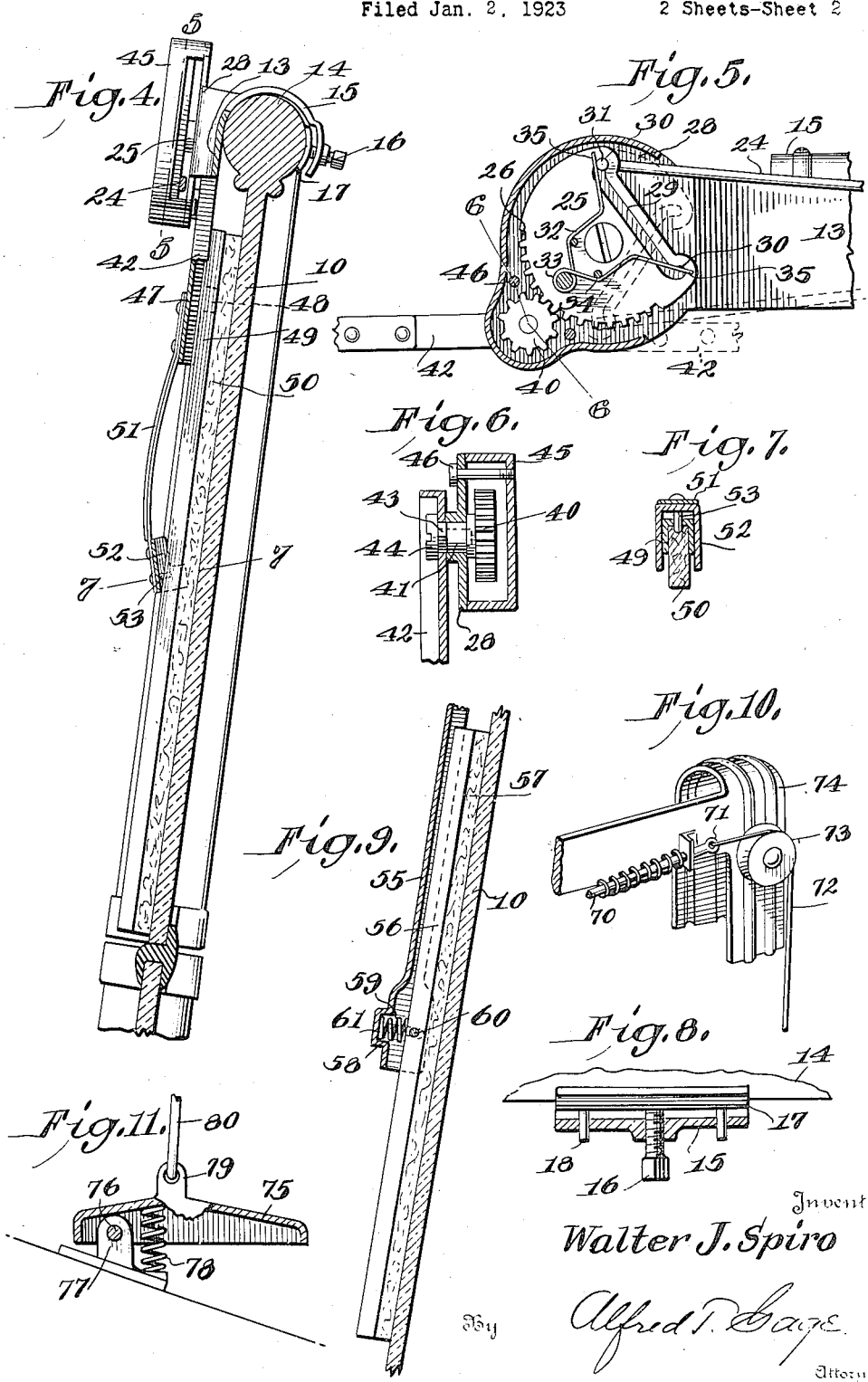
Inventor
Walter J. Spiro Patented July 8, 1924.

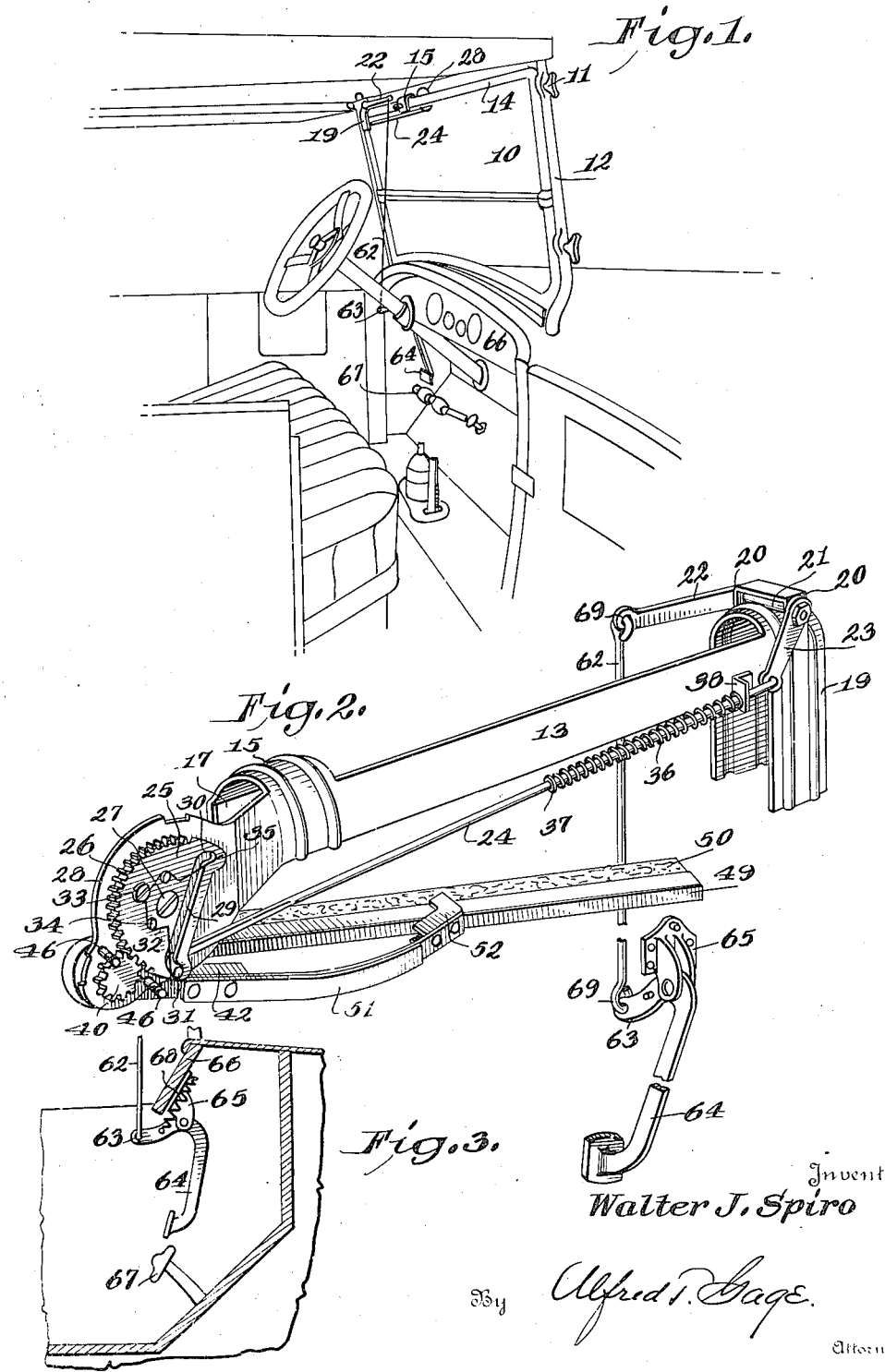

1,500,654

UNITED STATES PATENT OFFICE.

WALTER J. SPIRO, OF WHITE PLAINS, NEW YORK.

WINDSHIELD CLEANER.

Application filed January 2, 1923. Serial No. 610,218.

*To all whom it may concern:*

Be it known that I, WALTER J. SPIRO, citizen of the United States, residing at White Plains, in the county of Westchester and State of New York, have invented certain new and useful Improvements in Windshield Cleaners, of which the following is a specification.

This invention relates to a windshield cleaner and particularly to a construction adapted to be conveniently operated by the foot of the driver of an automobile.

The invention has for an object to provide a novel and improved construction in which a pivoted wiper arm is alternately actuated in opposite directions by a positive movement.

Another object of the invention is to provide a structure which will permit the opening or swinging of the windshield without disturbing the operative relation of the wiper arm and actuating means therefor.

A further object of the invention is to present an arrangement of parts by which the wiper arm is actuated by an oscillating member and the connection for operating this member automatically shifted to different operating positions thereon for positive alternate movements.

Other and further objects and advantages of the invention will be hereinafter set forth and the novel features thereof defined by the appended claims.

In the drawings—

Figure 1 is a perspective showing the invention applied;

Figure 2 is a detail perspective of the cleaner;

Figure 3 is a vertical section showing the foot pedal;

Figure 4 is a similar view through the windshield with the wiper arm in section;

Figure 5 is an enlarged section on line 5—5 of Figure 4;

Figure 6 is a section on line 6—6 of Figure 5;

Figure 7 is a similar view on line 7—7 of Figure 4;

Figure 8 is a detail section of the clamp plate;

Figure 9 is a similar view of a modified form of wiper arm;

Figure 10 is a detail perspective of a modified actuating connection; and

Figure 11 is a detail section of a modified form of foot pedal.

Like numerals refer to like parts in the several figures of the drawings.

The numeral 10 designates the windshield which may be of any desired character and is pivotally mounted at 11 upon standards 12 in the usual manner. The supporting frame 13 of the cleaner is carried by the windshield frame 14 to which it is secured in any desired manner, for instance, by a lug 15 bent from the frame 13 and provided with an attaching screw 16 bearing against a clamp plate 17 to engage the frame 14, as shown in Figs. 4 and 8. This plate is provided with guide pins 18 passing through apertures in the lug 15 and the opposite end of the frame is formed with a depending yoke 19 adapted to embrace the side frame of the windshield to assist in retaining the parts in position. This yoke carries pivot lugs 20 for the shaft 21 which has an operating lever 22 at one end and a crank arm 23 at the opposite end from which a pull rod 24 extends longitudinally of the frame and connects with the oscillating member 25 for actuating the wiper.

This member 25 may be varied in construction, but a preferable form thereof comprises the segmental gear 26 pivoted at 27 upon an extension 28 from the frame and formed with an elongated slot 29 having seating sockets 30 at its opposite ends adapted to receive the end 31 of the pull rod. This end of the rod is temporarily retained in the sockets during pulling action by a light spring 32 secured at 33 and surrounding pins 34 so that its free ends 35 will bear against the end 31 of the rod. After each positive pulling action the position of the slot and rod are such that the latter is shifted from one socket to the other against the tension of the light spring 32. This may be accomplished by a coiled shifting spring 36 surrounding the rod and bearing at one end against a stop 37 thereon and at its other end against a guide lug 38 carried by the frame.

The segmental gear 26 meshes with a pinion 40 mounted in the extension 28 and the shaft 41 therefrom carries the wiper arm 42 secured in any desired manner, for instance, by fitting a squared end 43 of the shaft to which it is secured by a screw 44, as shown in Figure 6. These parts are generally enclosed by a casing 45 seated upon the extension and secured in position by screws 46 threaded into the casing.

Different forms of wiper arm may be used, but that shown by Figures 2 and 4 comprises a channel member 47 having lugs 48 embracing the frame 49 of the wiper 50. To the end of this member a tension spring 51 is attached and carries at its free end a yoke 52 embracing the wiper frame and having a retaining pin 53 entering an aperture in said frame, as shown in Figures 4 and 7.

A modified form of the wiper arm is shown in Figure 9, where the channel member 55 embraces the frame 56 of the wiper 57 and is formed at its free end with a socket 58 having slotted side walls 59 through which a pin 60 carried by the frame 56 extends. A tension spring 61 is disposed in socket 58 to bear against the frame and maintain constant pressure of the wiper upon the glass.

The pull rod may be actuated by any desired connection, a preferable form of which is shown in Figures 1, 2 and 3, wherein a link 62 has a free pivotal connection at 69 with the operating lever 22 and the angle arm 63 of the foot pedal 64 which is pivotally mounted by a bracket 65 upon the instrument board 66, or any other fixed part. This pedal 64 is disposed immediately above the ordinary clutch pedal 67 of the machine so as to be conveniently operated by the toe of the driver's foot, and may be provided with a restoring spring 68 extending from the arm 63 to the bracket 65. The free pivotal connection of the link permits the windshield and parts carried thereby to be swung in either direction without affecting the operative relation of the parts.

A modified form of operating means is shown in Figure 10, wherein the pull rod 70 is formed with an eye 71 from which a flexible connection 72 extends over a grooved wheel 73 upon the frame to the pedal before described.

This pedal may also be varied in construction, as shown in Figure 11, in which the pedal 75 is pivoted at 76 upon a bracket 77 secured to the foot board of the machine and normally held in raised position by a spring 78 disposed between the bracket and pedal. The latter is provided with a pivoting lug 79 for the link of operating connection 80.

In the operation of the invention the wiper is positively actuated by the foot for each movement in alternately opposite directions and the pull rod automatically shifted upon the oscillating member for this purpose by its spring. The rod is retained in a socket during the pulling action but is released therefrom by the greater tension of the shifting spring when pressure is removed from the operating pedal. With the parts at rest in the full line position of Figure 5, pressure upon the pedal swings the wiper, leaving the oscillating member in the dotted line position. When the foot is withdrawn from the pedal the shifting spring moves the rod along the slot to the opposite seat, and subsequent operation of the pedal effects a positive movement of the parts back to the full line position. It has been found that an attempt to restore the wiper by a spring action is not practically effective owing to the resistance of the wiper by contact with the glass or sleet or snow adhering thereto. The invention provides means by which all movements of the wiper will be by positive actuation of a pedal member. The yielding pivotal mounting of the wiper secures the most effective contact with the glass, and the connections from the windshield permit the latter to be freely opened and adjusted without affecting the operating position of the parts. The location of the pedal adjacent the clutch pedal renders it accessible for the left foot of the operator which under normal driving conditions is free for actuation of the wiper and may be supported upon the clutch pedal for such purpose.

While the details of construction have been specifically shown and described, the invention is not confined thereto, as changes and alterations may be made therein without departing from the spirit of the invention as defined by the following claims.

What I claim is:

1. In a windshield cleaner, a manually operable member, a movable arm carrying a wiper, and actuating means between said member and arm shiftable at its actuating connection with the arm to reverse the direction of drive thereof by successive operations of said member in one direction.

2. In a windshield cleaner, a movable wiper arm, a pivoted actuating member for said arm, a reciprocating operating member automatically shiftable at its connection with the actuating member to opposite sides of the pivot thereof to reverse the direction of its drive, and a manually operable connection for moving said operating member in a direction opposite to its automatic movement.

3. In a windshield cleaner, a foot pedal, a movable arm carrying a wiper, and connecting means between said arm and pedal shiftable to actuate the wiper in a downward movement of the pedal and automatically changeable in operative relation to the arm in the upward travel of the pedal to effect opposite actuations of the wiper in a second downward movement of the pedal.

4. In a windshield cleaner, a pivoted wiper arm, a pivoted member connected to oscillate the same, a pull rod connected to said member at one side of its pivot and movable thereon to the opposite end thereof, and means for automatically shifting said rod to the opposite side of said pivot in the alternate operations of said rod.

5. In a windshield cleaner, a pivoted wiper arm, a pivoted member connected to oscillate the same, a pull rod slidingly connected to said member at one side of its pivot, a pedal adapted to actuate said rod, and a spring disposed to automatically shift said rod to the opposite side of the pivot of said member in the alternate movements of said pedal.

6. In a windshield cleaner, a pivoted wiper arm, a pivoted actuating member connected to said arm and provided with an elongated slot terminating in seats at opposite sides of the member pivot, and an operating device disposed at one end in said slot and adapted to be shifted from one seat to the other in the alternate movements of said device.

7. In a windshield cleaner, a pivoted wiper arm, a pivoted actuating member connected to said arm and provided with an elongated slot terminating in seats at opposite sides of the pivot member, a pull rod connected at one end in said slot and shiftable from one seat to the other, and a spring secured to said rod to automatically shift the same between said seats on being returned at the end of each pull on the rod.

8. In a windshield cleaner, a pivoted wiper arm, a segmental gear to actuate said arm and provided with an elongated slot terminating in seats at opposite sides of the pivot member, a pull rod connected at one end in said slot and shiftable from one seat to the other, a device for moving said rod in one direction, and a spring secured to said rod to move the same in an opposite direction and automatically shift it from one seat to the other on being returned at one end of each pull on the rod.

9. In a windshield cleaner, a pivoted wiper arm, a segmental gear to actuate said arm and provided with an elongated slot having seats at opposite sides of its pivot, a reciprocating device connected at one end in said slot and shiftable from one seat to the other, a spring for retaining said device in said seats, and a master spring for automatically shifting said device from one seat to the other upon the return movement of said device after each arm operating action.

10. In a windshield cleaner, a pivoted wiper arm having a pinion upon its pivot shaft, a segmental gear meshing with said pinion and provided with an elongated slot having seats at opposite sides of its pivot, a pull rod connected at one end in said slot and shiftable from one seat to the other, a retaining spring carried by the gear to retain the rod in said seats, and a return spring for said rod serving to automatically shift said rod from seat to seat.

11. In a windshield cleaner, a frame, a crank arm pivotally mounted at one end thereof, a segmental gear disposed at the opposite end of the frame, a wiper arm having its pinion meshed with said gear, a pull rod from the crank arm to said gear and shiftable thereon to opposite sides of its pivot in the alternate movements of the rod, and means for automatically shifting said rod in one direction to change its relation to the gear pivot.

12. In a windshield cleaner, a frame, a pivot shaft at one end thereof provided with an operating lever and crank arm, a segmental gear disposed at the opposite end of the frame, a pinion meshing with said gear, a wiper arm secured to the shaft of said pinion, a pull rod from the crank arm slidably mounted upon said gear and shiftable to opposite sides of the pivot thereof, a tension spring upon said rod to automatically shift the same, a pedal member, and a connection therefrom to said operating lever.

13. In a windshield cleaner, a frame, a wiper arm pivoted thereon, a wiper frame pivoted intermediate its ends to the free end of said arm for lateral movement thereon, and a tension spring disposed between said arm and wiper frame to project the latter away from the arm.

In testimony whereof I affix my signature.

WALTER J. SPIRO.